United States Patent [19]
Thanscheidt

[11] Patent Number: 6,003,546
[45] Date of Patent: Dec. 21, 1999

[54] ADAPTER DEVICE

[75] Inventor: Gunter Thanscheidt, Hilden, Germany

[73] Assignee: itm, Ute Thanscheidt, Hilden, Germany

[21] Appl. No.: 08/645,861

[22] Filed: May 14, 1996

[30] Foreign Application Priority Data

May 15, 1995 [DE] Germany ............................ 195 18 244

[51] Int. Cl.⁶ .................................................. F16K 51/00
[52] U.S. Cl. ........................... 137/565; 137/876; 251/297
[58] Field of Search ................................... 137/565, 876; 251/297

[56] References Cited

U.S. PATENT DOCUMENTS

| 2,371,657 | 3/1945 | Stark ........................................ 251/297 |
| 3,385,321 | 5/1968 | Ehrens et al. ............................ 251/297 |
| 4,169,491 | 10/1979 | Bajka ...................................... 137/876 |
| 4,723,567 | 2/1988 | Philpot et al. ........................... 251/297 |
| 4,932,849 | 6/1990 | Scheffer . | |
| 5,123,449 | 6/1992 | Nowicki .................................. 251/297 |

FOREIGN PATENT DOCUMENTS

| 437650 | 4/1912 | France . |
| 592 636 | 2/1934 | Germany . |
| 17 52 315 | 9/1957 | Germany . |
| 38 19 771 A1 | 6/1989 | Germany . |
| 94 13 154 | 11/1994 | Germany . |

*Primary Examiner*—A. Michael Chambers
*Attorney, Agent, or Firm*—Collard & Roe, P.C.

[57] ABSTRACT

The present invention relates to an adapter device 1 for a pump system. Due to the large number of various valve connections in use, employing a number of different pump systems with the corresponding valve connections is normally necessary. In order to use the largest number of valve connections possible with a single pump system, an adapter 1 is proposed which is characterized by a sealing element 24 that can be swiveled and/or shifted inside a housing 4 and moved through an external ring-shaped sleeve 12 which at least partially encloses the housing 4. Using the sealing element 24 which can be swiveled and shifted, the unneeded outlets in the pump system can be sealed and the desired outlet is simultaneously connected to the interior 6 of the pump system in such a way that an effective seal is created after insertion of the respective compressed-air connection.

17 Claims, 7 Drawing Sheets

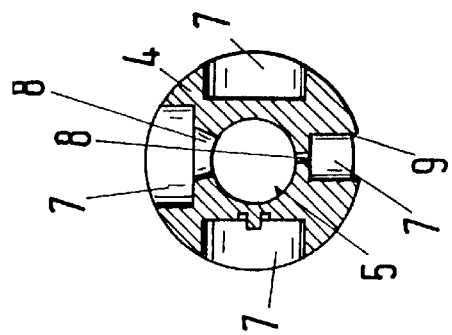
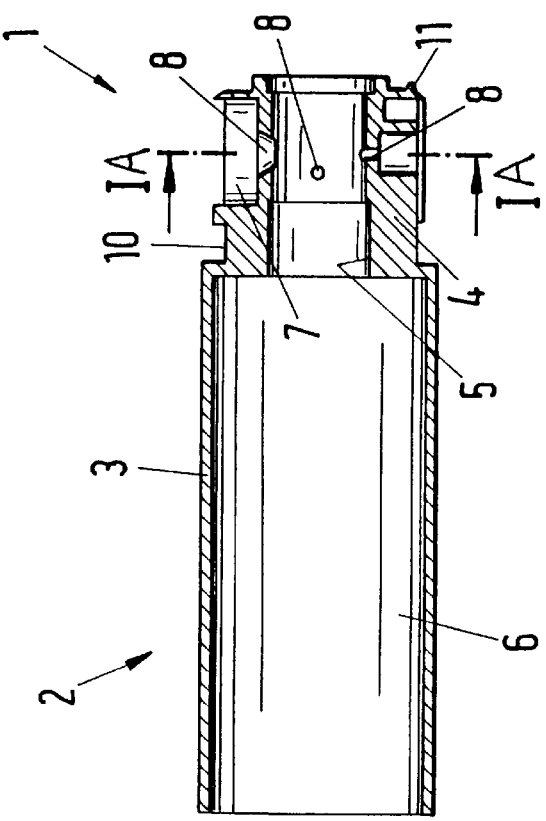

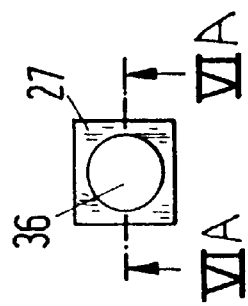
Fig. 4
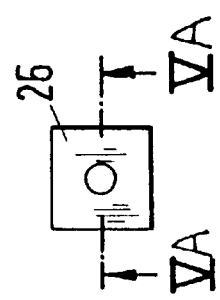
Fig. 4A
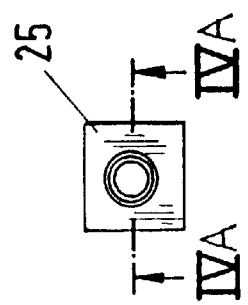
Fig. 5
Fig. 5A
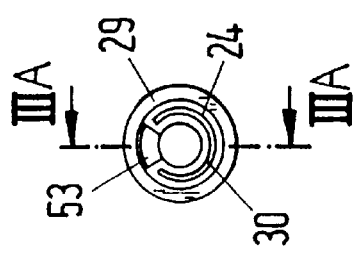
Fig. 6
Fig. 6A
Fig. 3
Fig. 3A

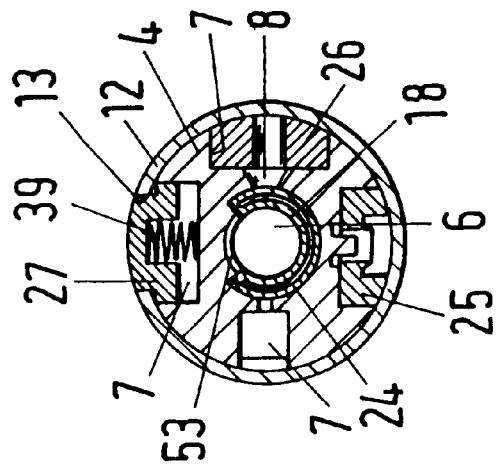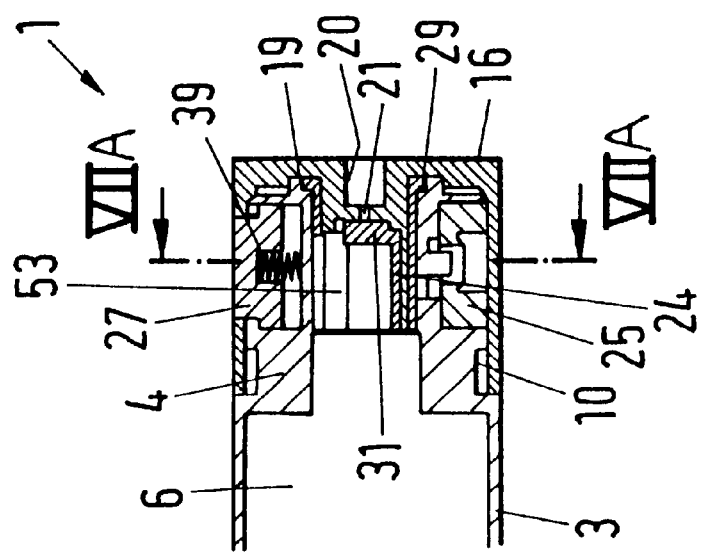

Fig. 8
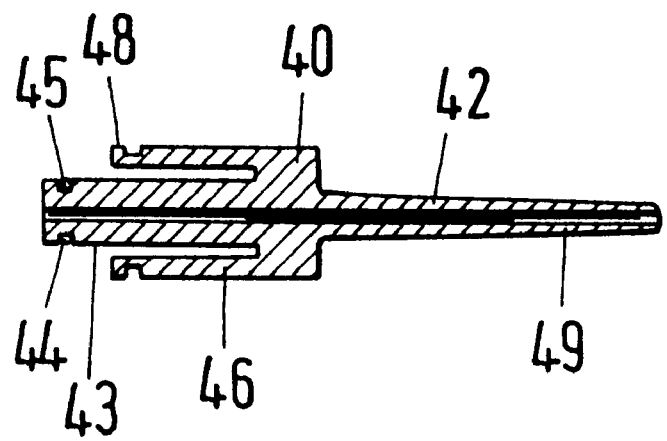
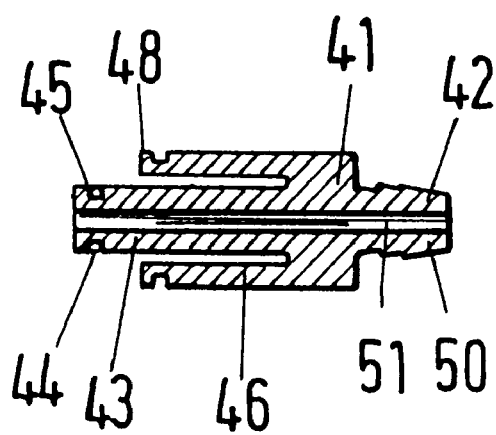
Fig. 9

ADAPTER DEVICE

The present invention relates to an adapter device, especially for connecting a pump system to various types of valve connections, with a housing provided with an inlet for the medium to be pumped and several outlets, whereby the outlets can optionally and individually be connected to the inlet and are sealed off from the inlet by means of a sealing element.

Pump systems of the type described above are required for various applications, both in industry and private homes; for example, the most widely known pump system is an air pump used for inflating air cushions, inflatable rafts and bicycle and automobile tires, whereby this pump can be operated manually or motor-driven. Normally, the previously described types of air pump is provided with different types of valve connections; for example, a Schrader valve is used for automobile tires and a Sclaverand valve is used for bicycle tires. The difference in valve designs makes it impossible to use a single valve connection. On the contrary, an appropriate pump system with the corresponding valve type must be used for each individual valve connection. Procuring several different pump systems is, on the one hand, quite costly and, on the other hand, can possibly cause damage to the valve connection when the incorrect valve connection is used by mistake. Damage to the pump system's valve seal itself is also possible.

For example, a combination air pump for automobile and bicycle tires which is provided with two types of connections has been suggested for reducing the number of pump systems required. Two diametrically opposed connections, one for the Schrader valve and a second for the Sclaverand valve, are located on the front face of the air pump. The connection which is not needed is sealed by means of a ball seal. The ball is located in a bored hole arranged diagonally to the pump's longitudinal axis and provided with the one of the two connections at each end. Gravity causes the ball to fall against the sealing lip beneath it and the pressure of the air presses it down, thereby creating a seal. The air pump's proper function is ensured only when the bored hole is aligned approximately vertically in relation to the ball. When the bored hole is horizontal, i.e. with a vertically aligned valve, for example, the ball's position is not precisely defined or gravity does force it into a position which so that it creates a seal, so that pressure is not applied to a seal and therefore the second outlet is not sealed. Furthermore, a maximum of two valve connections can be used when the air pump is designed with a ball seal is possible.

Therefore, the purpose of the invention is to create an adapter device which permits the use of as many different kinds of valve connections as possible on a single pump system, at the same time avoiding the disadvantages described above.

Fulfillment of this purpose is provided according to the invention in that the sealing element can be swiveled and/or shifted within the housing and moved through an external ring-shaped sleeve which at least partially encloses the housing.

The use of a sealing element which can be swiveled and/or shifted makes it possible to distribute several connections around the circumference of the housing. When the sealing element is swiveled, the valve connection which is not needed can be sealed off and a certain valve connection can be selected and connected to the pump system. Furthermore, the possibility of shifting the sealing element makes it possible to arrange additional valve connections on a second or even third level. In a practical feature, the sealing element located within the housing is swiveled or shifted through a ring-shaped sleeve which at least partially encloses the housing for the purpose of ensuring a secure hold and providing an additional seal. An additional advantage of this adapter is that the function of the pump system is guaranteed in every position and the number of possible connections results in a considerable reduction in cost, as a single pump system can be used for the various compressed-air systems.

In a first advantageous embodiment of the invention, the housing is open on one end and the sleeve can be slid onto the end of the housing and seal it. In this case, the sleeve forms the front face of the adapter's or pump unit's housing and additionally enables swift and efficient assembly.

In a further embodiment of the invention, the outlets are distributed along the circumference and/or around the housing's longitudinal axis, which makes it possible to increase the number of outlets or possible connections as desired.

In a further embodiment of the invention, the arrangement of the sleeve is coaxial to the housing and above the individual outlets and it exposes not more than one of the outlets through an opening or seals them all. Only one of the outlets in the housing is exposed, depending on the position to which the sleeve is turned, and confusing the various valve connections is impossible when the connection is labeled appropriately. Furthermore, the tightness of the seal and the strength of the pump system is increased by the coaxially arranged sleeve.

An optimum seal of the outlets which are not being used is ensured in that the sealing element is ring-shaped and provided with a segment which extends over a part of the sealing element in an axial direction, and that it is also provided with an internal connecting channel to the housing's inlet. Only the outlet located directly above the segment is connected to the pump unit via the segment, while the remaining outlets are simultaneously sealed by the sealing element. Furthermore, this arrangement permits a reduction in the size of the adapter because longer shafts of individual valve connections can be inserted through the segment and into the adapter's housing.

Connecting the sealing element to the outer sleeve or ensuring that the sealing element is swiveled or shifted is provided in that the sealing element is at least partially double-walled and that it forms a pocket which the sleeve's segmental ring projection penetrates for the purpose of moving it.

Ensuring that the valve connection is inserted into the adapter and that it is connected to the pump system requires that the opening in the sleeve and the segment of the sealing element are in alignment after assembly so that the segment swivels simultaneously with the sleeve.

In a further embodiment of the invention, the sleeve or the housing on the front face is provided with a threaded or plug-type connection with a connecting channel leading inwards which can be closed by means of a seal. The threaded or plug-type connection located in the front face permits the attachment of an additional outlet or connection to the adapter. For example, a hose connection with a corresponding threaded or plug-type connection can be screwed or pressed into the front face so that the pump system can be provided with additional valve connections on the opposite end of the hose. Doing this requires that the sleeve seals all other ring-shaped openings and that the seal of the connection's bored hole in its front face is simultaneously exposed through the threaded or plug-type connection.

Reducing the number of sealing elements required to a single internal seal which seals both the bored hole in the front face and the individual outlets is possible in that the sealing element is provided with a ring-shaped collar on one end and a front face which is set back and partially interrupted in the shape of a ring, whereby a thickened elastic segment is located on the front face for the purpose of sealing the connection's bored hole. The inserted threaded or plug-type connection presses this thickened elastic segment inward for the purpose of creating a connection to the pump system.

Use of the pump system with an attached adapter and the selection of the various available connections can be improved in that the housing and the sleeve are provided with a locking system comprising a groove-and-spring combination which always engages when the opening in the sleeve exposes an outlet.

In a further embodiment of the invention, the outlets in the housing comprise a connecting channel and a round or angular recess which receives a seal corresponding to the respective seal system. This makes it possible to exchange defective or leaky seals after removing the sleeve and increases the service life of the pump unit.

The adapter can be fixed in that a knob is used to lock the sleeve instead of an outlet in a lock-in position.

The ability of the sleeve to swivel or shift is ensured in that the sleeve is provided with at least one axial longitudinal groove and/or a snap ring groove for guiding purposes, and at least on projection on the sleeve penetrates and is guided through this groove. Using a snap ring groove in the housing ensures that the sleeve can be swiveled, while its ability to shift is ensured by an axial longitudinal groove.

A combination of an axial and a ring-shaped guidance groove permits the removal of the sleeve when it is in a specific position, such as that determined by the locking push-button.

In a further embodiment of the invention, the threaded or plug-type connection can receive a hose connection or a manometer. Connection of, for example, a permanently attached manometer to the adapter makes it possible to measure the air pressure in a compressed-air system which is connected to the pump system by means of one of the remaining outlets. When a hose connection is employed, the possible variations with regard to connections can be increased as desired and valve connections which are not easily accessible can also be reached.

In a further embodiment of the invention, one of the recesses receives an adapter, e.g. a ball or hose adapter, which clips into a snap ring groove in the recesses with a plug-type connection or several fastening projections for the purpose of fixing it and which is sealed by an O-ring located across from the housing.

The use of a hose adapter is necessary when access to the valve connections for a direct connection to the adapter is difficult or impossible, such as with wheelchairs, sack trolleys and automobile or motorcycle tires. For this reason, the opposite end of the hose adapter is provided with a bell-shaped valve connection on the other end of the hose which is connected by means of a regulating switch which can be swiveled in such a way that it cannot turn and the valve connections are sealed or individually exposed, whereby the regulating switch is arranged so that it can be swiveled from the outside.

In a further embodiment, the regulating switch is provided with an external knob and an internal cylindrical segment with a rear face, whereby the cylindrical segment extends over a three-quarter circle and receives an inwardly projecting peg of the hose connection in such a way that the regulating switch is secured against falling out, whereby the regulating switch is provided with a center position at which both valve connections are closed and two additional positions at which one of the two valve connections is connected to the hose via a connecting channel.

Securing both valve connections is made possible in that the valve connections can be swiveled and are secured by a fixture which locks into a groove in the valve connections.

A special application of the hose adapter with the bellshaped valve connection is designed to regulate oil and pneumatic suspension systems which must not lose pressure when being set and when the valve connection is removed. The center position of the regulating switch makes this possible by closing the connecting channel leading to the valve connections.

The invention is described in greater detail on the basis of the figures.

The following is shown:

FIG. 1 shows a sectional side view of one end of the housing of a pump system;

FIG. 1A shows a cross-sectional view along lines 1A—1A of FIG. 1;

FIG. 3 shows a top view of a sealing element which seals the various outlets;

FIG. 3A shows a cross-sectional view along lines IIIA—IIIA of FIG. 3;

FIG. 4 shows a top view of a rubber seal according to the invention;

FIG. 4A shows a cross-sectional view along lines IVA—IVA of FIG. 4;

FIG. 5 shows a top view of another rubber seal according to the invention;

FIG. 5A shows a cross-sectional view along lines VA—VA of FIG. 5;

FIG. 6 shows a top view of the locking push-button according to the invention;

FIG. 6A shows a cross-sectional view along lines VIA—VIA of FIG. 6;

FIG. 7 shows a sectional side view of the housing with the sleeve after assembly;

FIG. 8 shows a sectional side view of a ball adapter according to the invention;

FIG. 9 shows a sectional side view of a hose adapter according to the invention;

Figure 2A:
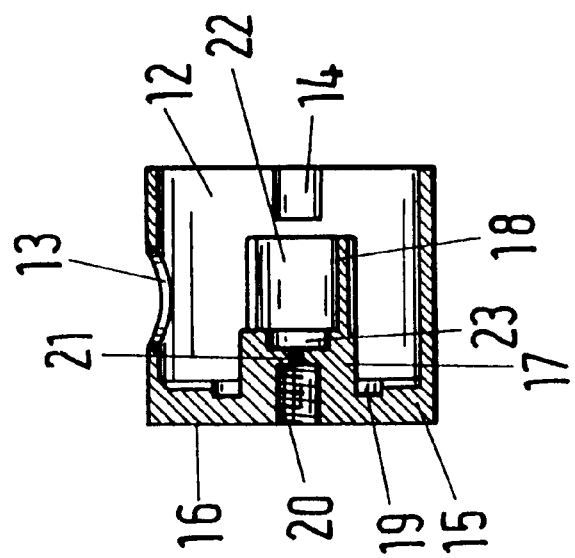
FIG. 2A shows a cross-sectional view along lines IIA—IIA of FIG. 2.

In a sectional side view and along the section I—I, FIG. 1 and FIG. 1A show an adapter 1 which forms one piece with a pump system 2. Solely a diagram of the ring-shaped outer sleeve 3 is shown of the pump system 2. The housing 4 of the adapter 1 forms part of the ring-shaped outer sleeve 3 and primarily comprises a ring-shaped projection and several bored holes or openings. A central and an axial bored hole 5 is connected to the pump's interior 6 of the pump system 2. As can be seen in the section I—I, a total of four recesses 7 are incorporated into the housing 4, and these recesses 7 are arranged at 90° angles to one another. Distributing a larger recesses 7 along the circumference of the housing 4 is also conceivable. The rear of the upper recesses 7 are polygonal, while the lower recess 7 is round and designed to receive a ball adapter. Three of the recesses 7 are connected to the central bored hole 5 by means of a connecting channel 8. The size of the recesses 7 and that of the connecting channel 8 correspond to the sizes of the various valve connections, whereby a suitable rubber seal or the ball adapter is inserted into each recess 7 during assembly. Depending on the specific valve connection employed, the connecting channel 8 comprises a small bored hole or a relatively large opening which permits the insertion of the valve stem to the inner bored hole 5, allowing a reduction in size.

On the other hand, the fourth recess 7 is not provided with a connection to the central bored hole 5; it is intended to receive a push-button which permits a locking closure of the adapter 1, i.e. with the housing 4 and the sleeve. When in the locked position, the various openings are covered by the sleeve shown in FIG. 2 for the purpose of preventing the accumulation of dirt or dirt particles from entering the pump's interior 6. A longitudinal groove 9 and a snap ring groove 10 are incorporated into the housing 4 for the purpose of guiding a projection which forms a part of the sleeve. With the aid of the projection, the sleeve can be shifted through the longitudinal groove 9 and swiveled into any desired position through the snap ring groove 10, whereby its position can be fixed with a projection 11 which forms part of the housing 4. The projection 11 penetrates a star-shaped groove in the sleeve for this purpose.

Figure 2:
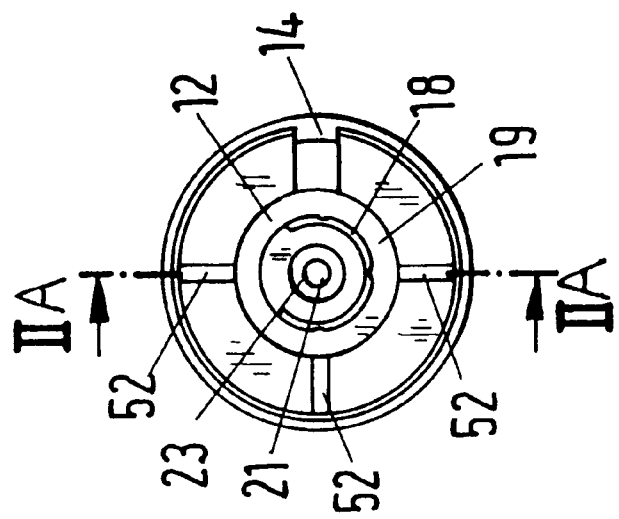
FIG. 2 shows a sectional side view of a sleeve for a housing according to FIG. 1.

FIG. 2 and FIG. 2A show a sleeve 12 in an overhead view and in a sectional side view which can be shifted onto the housing 4 coaxially. The sleeve 12 is provided with an opening 13 which exposes one of the recesses 7 or permits the locking of the locking knob depending on the turned position of the sleeve 12. A projection 14 which forms part of the inner surface of the sleeve is directed into the longitudinal groove 9 or the snap ring groove 10 in the body 4. The projection prevents the removal of the sleeve 12 from the body 4 except at a certain turned position. The end of the sleeve 12 facing away from the projection 14 is closed off by a wall 15 with a front face 16. A circular projection 17 forms part of the inner surface of the wall 15, and this projection 17 is extended by means of a segmental ring projection 18. The segmental ring projection 18 extends over a three-quarter circle, and its opening is aligned with the opening 13 of the sleeve 12.

The sealing element shown on the left side of FIG. 3 is shifted on the segmental ring projection 18 and used to seal the various outlets. A groove 19 which receives the ring-shaped collar of the sealing element is located in the wall 15 and surrounds the projection 17. A central bored hole 20 located in the front face 16 extends into the projection 17 and is connected to the bored hole 22 of the segmental ring projection 18 by means of a small connecting channel 21. Furthermore, a recess 23 which receives a seal for the bored hole 20 is incorporated into the projection 17. The bored hole 20 is sealed off from the pump's interior 6 by the seal and receives, for example, a hose adapter or a manometer, each of which are provided with and internal part which presses the seal inward, thereby opening a connection to the pump's interior 6. A star-shaped groove 52 extending from the segmental ring projection 18 in which the projection 11 of the housing 4 locks to create a fixed bond is located on the inner surface of the wall 15.

FIGS. 3–6A show an overhead view and a sectional view of various sealing elements consisting of a permanently elastic material. FIG. 3 shows the sealing element 24 for the segmental ring projection 18, while two seals 25, 26 for the recesses 7 are shown in FIGS. 5, 5A, and 6, 6A, respectively, and FIGS. 7 and 7A show a locking push-button 27.

The sealing element 24 comprises a circular section 28 with an integral rounded collar 28 and a ring-shaped projection 30 with double walls which extends over a three-quarter circle. During assembly, a segmental ring projection 18 of the sleeve 12 is inserted into a double-walled projection which forms a type of pocket. Furthermore, the double-walled area of the projection 30 seals the various outlets of the adapter while the open segmental cutout 53 of the projection 30 enables the creation of a connection between the respective outlets and the pump's interior 6. The size of the segmental cutout 53 of the projection 30 was chosen so that it can receive the shaft of a valve connection which is not shown for the purpose of reducing the size of the adapter 1 as much as possible. Furthermore, the sealing element 24 is provided with a front face 31 which is set back and partially interrupted in the shape of a ring which functions as a spring due to its permanent elasticity and which seals the bored hole 20 or the connecting channel 21 from the pump's interior 6 when at rest. When a hose adapter which can be screwed into the bored hole 20 of the sleeve 12 is used, the front face 31 of the sealing element 24 is pressed inward, thereby opening the connecting channel 21 to the pump's interior 6.

The seals 25, 26 provided for the recess 7 in the housing 4 are shown in the FIGS. 5, 5A and 6, 6A, respectively; the basic shape of all the seals 25, 26 is square, which corresponds to the recess 7. The surfaces of the seals 25, 26 which will face outwards are provided with a curvature 32 which corresponds to the radius of the housing 4. The seal 25 is provided with a stepped bored hole 33 which is provided for receiving a valve connection. A wedge-shaped snap ring groove 54 which encloses the valve's edge when inserted is incorporated into the transitional area of the stepped bored hole 33. On the other hand, the seal 26 is provided with only one continuous bored hole 35 and receives a conventional bicycle valve. The push-button 27 shown in FIGS. 7 and 7A comprises a square base with a central round projection 36. A blind bored hole 38 which receives a spring which is not shown is located on the underside 37. The elastic force presses the push-button 27 outward through the opening 13 of the sleeve 12, thereby permitting the sleeve 12 to lock onto the housing 4 insofar as the opening 13 is aligned with the push-button 27.

FIGS. 7 and 7A show in a sectional side view and along section VII—VII the adapter 1 after assembly. One can recognize in the sectional drawing that the push-button 27 has been inserted into the recesses 7 of the housing 4 in the upper position with a spring 39 in the blind bored hole 38, while a seal 25 or 26 has been inserted into the lower right recess 7. The left recess 7, on the other hand, is empty. The opening 13 faces upward in the turned position of the sleeve 12 so that the push-button 27 is pressed outward through the opening 13. The seals 25, 26 are additionally closed off by the sleeve 12 to prevent the accumulation of dirt. This position represents the locking position of the adapter 1 in which none of the outlets are connected to the pump's interior 6.

The seal from the pump's interior 6 is created by the sealing element 24, which is slid onto the segmental ring projection 18 of the sleeve 12 and the open segmental cutout 53 of faces the push-button 27. When the sleeve 12 is turned, the segmental ring projection 18, which forms one piece with the sleeve 12, turns with it so that the segmental cutout 53 of the sealing element 24 turns toward the outlet; at the same time, a connection to the pump's interior 6 is created. The bored hole 20 in the front face 16 is sealed off by the front face 31 of the sealing element 24 so that only one sealing element is required for all outlets on the housing 4. Alternately, the bored hole 20 can be sealed by a separate seal. The sealing element 24 itself is slid onto the ring-shaped projection 17 on the sleeve 12, and its collar 29 lies in the ring-shaped groove 19 so that the pump's interior 6 is sufficiently sealed off from the sleeve 12.

FIG. 8 shows a hall adapter 40 and and FIG. 9 shows a hose adapter 41, both in a sectional side view. Both adapters 40, 41 are provided with a central bored hole 42 which functions as an air channel. A ring-shaped projection 43 of the adapter 40, 41 is provided with a groove 44 with an O-ring 45 which seals off the adapter 40, 41 from the sleeve 24. The projection 43 is optionally inserted into the free recess 7 of the sleeve 12 or can be screwed into the bored hole 20 in the sleeve 12 when used with a threaded connection, whereby the extended projection 43 presses the elastic front face 31 of the sealing element 24 inward so that the bored hole 42 is connected to the pump's interior 6 and the creation of a seal from the sleeve 12 by the O-ring 45 and the groove 44 is ensured. A circular segment 46 surrounds the projection 43 for the purpose of fastening the adapter 40, 41 in the recess 7; this circular segment 46 is set back from the projection 43. The circular segment 46 forms one piece with the adapter 40, 41 and its free end is provided with an attachment lug 48 which can lock into the ring-shaped groove in the sleeve 12 and which ensures a secure attachment of the adapter 40, 41 in the free recess 7 of the sleeve 12. The end of the adapter 40 which faces outward comprises a valve needle 49 ending in a cone which can be pressed into the hose of a ball, while the hose adapter 41 is provided with a short peg 50 provided with a stepped ribbing for the purpose of fastening a hose which is not shown. Additional external connections, e.g. a connection for a twin system, can also be provided with the aid of the hose adapter.

Furthermore, the housing 4 can be provided with a relatively large number of recesses and connecting channels, and the sleeve 12 can additionally be arranged in such a way that it can be shifted for the purpose of making the various valve connections .

Figure 10:
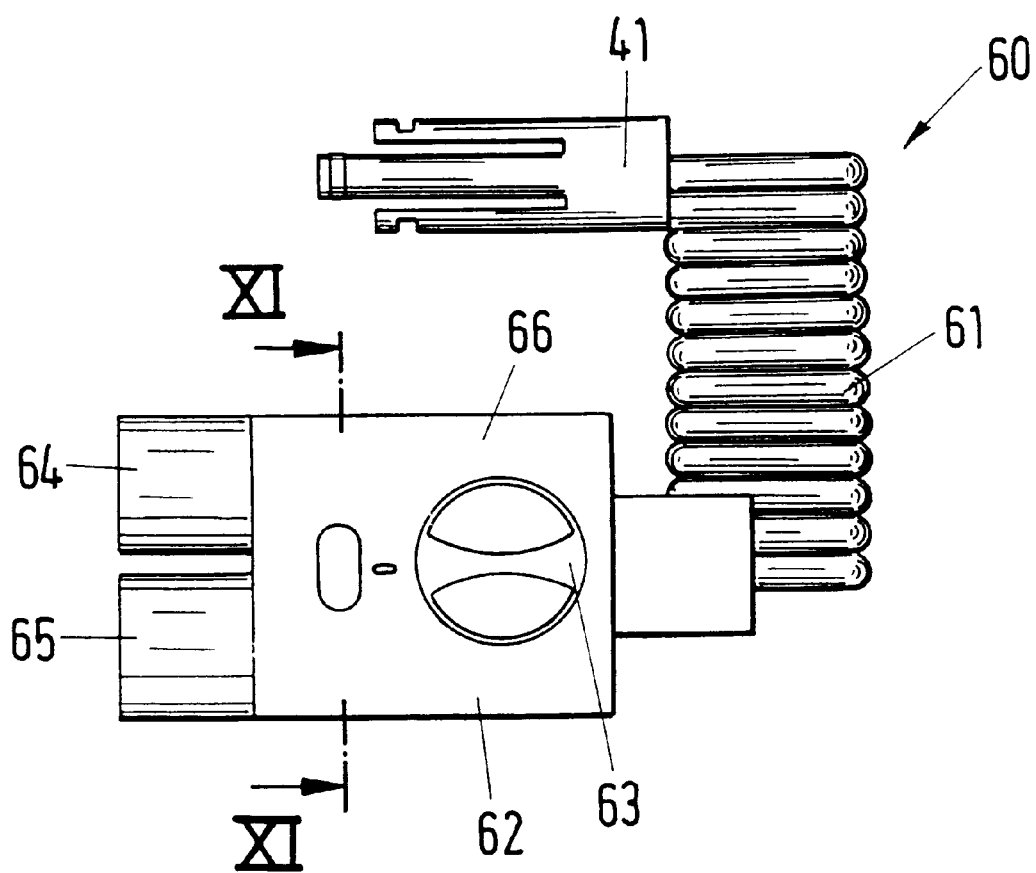
FIG. 10 shows a top view of a hose adapter with the hose and a bell-shaped valve connection.

FIG. 10 shows an overhead view of a hose connection 60 comprising a hose adapter 41, a hose 61 and a bell-shaped valve connection 62. The hose adapter 41 essentially corresponds to the one shown in FIG. 9, whereby the hose 61 is inserted into the hose adapter 41 rather than the peg 50. The hose is coiled and provided with sufficient length to permit a connection to valves which are not easily accessible. A bell-shaped valve connection 62 with a regulating switch 63 which can be set to three different positions is located at the other end of the hose 61. Both the Schrader 64 and the Sclaverand valve connections 65 are closed in the center position. An internal connection to the Schrader connection 64 is created in the upper position, and a connection to the Sclaverand connection 65 is created in the lower position, so that a connection to the adapter which is not shown can be created via the hose 61 and the hose adapter 41. Both connections 64, 65 can be swiveled on the housing 4 of the bell-shaped valve connection 62, thereby making it easier to screw on the respective valve.

Figure 11:
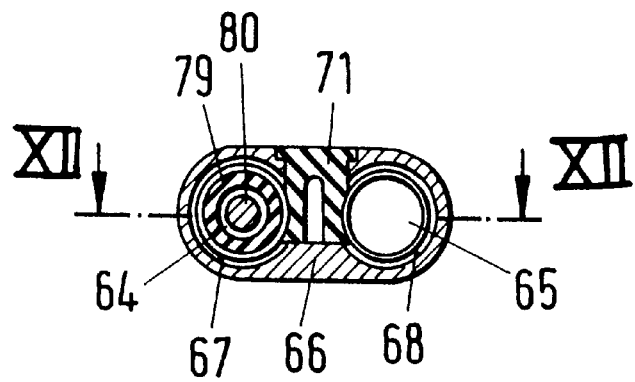
FIG. 11 shows a sectional overhead view along lines XI—XI of FIG. 10.
Figure 12:
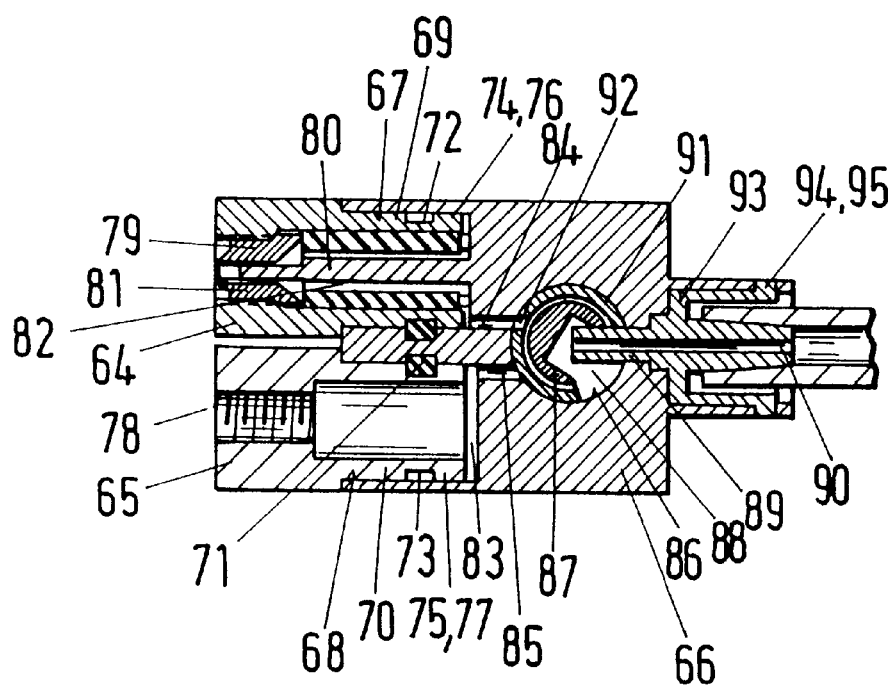
FIG. 12 shows a cross-sectional view along lines XII—XII of FIG. 11.

FIGS. 11 and 12 show a sectional view through the housing 66 of the bell-shaped valve connection 62 along the connection line XI—XI of FIG. 10 and a sectional view along the connection line XII—XII. The upper figure shows both valve connections in a sectional overhead view in which the Schrader connection 64 is shown on the left side and the Sclaverand connection 65 is shown on the right side; both are attached to the housing 66 so that they can be swiveled. The housing 66 is provided with two bored holes 66, 67 into which the connections 64, 65 with reduced ends 69, 70 project for this purpose and which hold a fixture 71 which catches in a groove 72, 73.

Both of the connections 64, 65 are sealed by an O-ring 74, 75 which lies in a groove 76, 77. The Sclaverand connection 65 is provided with only one threaded bored hole 78 for screwing on the connection, while the Schrader connection 64 is provided with a seal 79 and a peg 80 located in its center which presses against the valve needle of a Schrader valve, thereby opening it. In order to prevent a loss of pressure when the connection is screwed on, the peg 80 is set back from the seal 79 so that the Schrader valve presses against the seal 79 and is firmly enclosed by it, especially on the inner side, before the peg 80 actuates the valve needle. The outer side of the seal 79 is provided with a curvature 81 which is pressed against the ring of the Schrader valve, thereby sealing it especially well. The rear of the seal 79, on the other hand, is extended in the shape of a cone for the purpose of ensuring that the resilience of the seal 79 in the valve connection.

In both cases, the compressed air is fed from a connecting channel 82, 83 which leads through an extension channel 84, 85 to a bored hole 86 in which the regulating switch 63 can be swiveled. The regulating switch is provided with an external knob and an internal cylindrical segment 87 with a rear face 88, whereby the cylindrical segment 87 extends over a three-quarter circle and receives a peg 89 which projects inward from the hose connection 90 in such a way that the regulating switch 63 can be swiveled inside the housing 66 but cannot fall out. The segment 87 and the peg 89 both delimit the area within which the regulating switch can swivel. A seal 91 with a bored hole 92 located on the outer surface of the regulating switch is connected to the regulating switch 63 in such a way that it cannot swivel and aligns the bored hole 92 with one of the two extension channels 84, 85 when the regulating switch 63 is swiveled. The hose connection 90 on the housing 66 comprises a stepped bored hole 93 with a recess 94 in which a peg 95 on the hose connection 90 catches.

I claim:

1. An adaptor device for connecting a pump system to various valve connections, comprising:
   a housing open at one end and provided with an inlet for medium to be pumped and several outlets, said outlets being optionally and individually connected to the inlet;
   a sealing element sealing said outlets off from the inlet, said sealing element adapted to be shifted inside the housing;
   a ring-shaped sleeve arranged coaxially with the housing and over the individual outlets and exposing a maximum of one of the outlets through an opening, said sleeve being adapted to be slid onto the end of the housing thereby enclosing the housing, wherein said sealing element is moved by said sleeve.

2. An adaptor device as claimed in claim 1, wherein the outlets are distributed around the circumference of the housing.

3. An adapter device as claimed in claim 2, wherein the sealing element is at least in part double-walled and forms a pocket, and wherein the sleeve has a segmental ring projection that penetrates said pocket.

4. An adapter device as claimed in claim 1, wherein the sealing element has a segmental cutout that is aligned with the opening in the sleeve after assembly.

5. An adapter device as claimed in claim 1, wherein the sleeve has a front face that is provided with a threaded connection with a connecting channel leading inward which can be closed off with a seal.

6. An adapter device as claimed in claim 5, wherein the threaded connection is provided to receive one of a ball adapter, a hose adapter and a manometer.

7. An adapter device as claimed in claim 6, wherein the hose adapter is provided with a bell-shaped valve connection on an end of the hose, said valve connection being connected to a sealing element by an externally controlled regulating switch, said regulating switch being swivelable and adapted to individually seal and expose off the valve connections.

8. An adapter device as claimed in claim 7, wherein the regulating switch is provided with an external knob and an internal cylindrical segment with a rear surface, wherein the cylindrical segment extends over a three-quarter circle and receives an inwardly protecting peg on the hose connection.

9. An adapter device as claimed in claim 7, wherein the regulating switch is provided with a center position at which both valve connections are closed and the regulating switch is provided with two additional positions at which one of the two valve connections is connected to the hose via a connecting channel.

10. An adapter device as claimed in claim 7, wherein the valve connections can be swivelled and are fastened by a fixture which catches in a groove on the valve connections.

11. An adapter device as claimed in claim 1, wherein the sealing element (24) is ring-shaped and provided with a segmental cutout (53) which extends over a section of the sealing element (24) in an axial direction and which is provided with an internal connecting channel leading to the inlet in the housing (4).

12. An adapter device as claimed in claim 5, wherein the sealing element is provided with a ring-shaped collar on one end and a front face which is set back and partially interrupted in the shape of a ring, wherein a thickened elastic segment is located on the front face for the purpose of sealing a bored hole in the connection.

13. An adapter device as claimed in claim 1, wherein the housing and the sleeve are provided with a catch comprising a groove-and-spring combination, which always engages when the opening in the sleeve exposes an outlet.

14. An adapter device as claimed in claim 13, wherein a push-button is provided for locking the sleeve in a lock-in position.

15. An adapter device as claimed in claim 1, wherein the outlets in the housing each comprise a connecting channel and a recess which receives a seal which corresponds to the sealing element.

16. An adapter device as claimed in claim 15, wherein one of the recesses is provided to receive an adapter, which clips into a snap-ring groove in the recess with one of a plug-type connection and several attachment lugs and which is sealed off from the housing by an O-ring.

17. An adapter device as claimed in claim 1, wherein the housing is provided with at least one groove in which at least one projection on the sleeve penetrates and is guided.

* * * * *